United States Patent
Laarman et al.

(10) Patent No.: US 9,873,410 B2
(45) Date of Patent: Jan. 23, 2018

(54) POWERED LANDING GEAR

(71) Applicant: Jost International Corp., Grand Haven, MI (US)

(72) Inventors: Gregory A. Laarman, Holland, MI (US); Brian E. Oestreich, Grand Haven, MI (US)

(73) Assignee: Jost International Corp., Grand Haven, MI (US)

( * ) Notice: Subject to any disclaimer, the term of this patent is extended or adjusted under 35 U.S.C. 154(b) by 210 days.

(21) Appl. No.: 14/620,875

(22) Filed: Feb. 12, 2015

(65) Prior Publication Data
US 2015/0224838 A1    Aug. 13, 2015

Related U.S. Application Data

(60) Provisional application No. 61/938,940, filed on Feb. 12, 2014, provisional application No. 61/970,870, filed on Mar. 26, 2014.

(51) Int. Cl.
*B60S 9/08* (2006.01)
*B60S 9/04* (2006.01)
*B60D 1/66* (2006.01)

(52) U.S. Cl.
CPC ............... *B60S 9/08* (2013.01); *B60D 1/66* (2013.01); *B60S 9/04* (2013.01)

(58) Field of Classification Search
CPC ...... B60S 9/08; B60S 9/18; B60S 9/04; B60S 9/06; B66F 3/18; B66F 3/44
See application file for complete search history.

(56) References Cited

U.S. PATENT DOCUMENTS

| | | | |
|---|---|---|---|
| 2,232,187 A | 2/1941 | Reid | |
| 2,464,890 A | 3/1949 | Premo | |
| (Continued) | | | |

FOREIGN PATENT DOCUMENTS

| | | |
|---|---|---|
| CN | 101808866 B | 6/2012 |
| DE | 19616704 | 10/1997 |
| (Continued) | | |

OTHER PUBLICATIONS

International Search Report and Written Opinion of the International Searching Authority from corresponding Patent Cooperation Treaty (PCT) Application No. PCT/US2015/015641, dated Sep. 22, 2015.

*Primary Examiner* — Monica Carter
*Assistant Examiner* — Seahee Yoon
(74) *Attorney, Agent, or Firm* — Gardner, Linn, Burkhart & Flory, LLP

(57) ABSTRACT

A powered landing gear includes a housing member and a telescoping leg member connected with the housing member, an internal gear assembly located within the housing member is configured to extend and retract the leg member. A shaft extends into the housing member and is connected with the internal gear assembly, where the internal gear assembly includes a ring gear arranged to rotate about an axis that is transverse to the telescopic orientation of the leg member with the internal gear assembly configured to operate in a high speed setting and a low speed setting, and with the internal gear assembly automatically shifting from the high speed setting to the low speed setting. A drive system is attached to the housing member and includes a drive motor and a drive gear, with the drive motor configured to operatively drive the shaft via the drive gear.

23 Claims, 17 Drawing Sheets

(56) References Cited

U.S. PATENT DOCUMENTS

| | | | |
|---|---|---|---|
| 2,959,395 A | 11/1960 | Strack et al. | |
| 3,007,677 A | 11/1961 | Dalton | |
| 3,136,527 A | 6/1964 | Griffis | |
| 3,764,162 A | 10/1973 | Rawlings | |
| 3,791,664 A | 2/1974 | Self et al. | |
| 3,888,464 A | 6/1975 | Felsen | |
| 3,927,863 A | 12/1975 | Polsky | |
| 4,847,960 A | 7/1989 | Hafla | |
| 5,118,082 A | 6/1992 | Byun | |
| 5,238,266 A | 8/1993 | Vandenberg | |
| 5,538,225 A | 7/1996 | VanDenberg | |
| 5,542,647 A | 8/1996 | Huetsch | |
| 5,676,018 A * | 10/1997 | VanDenberg | B60S 9/08 74/373 |
| 5,911,437 A * | 6/1999 | Lawrence | B60S 9/04 254/419 |
| 6,224,103 B1 * | 5/2001 | Hatcher | B60S 9/08 254/419 |
| 6,260,882 B1 * | 7/2001 | Kingsbury | B60S 9/08 254/219 |
| 6,261,199 B1 | 7/2001 | Schlangen | |
| 6,598,886 B2 * | 7/2003 | Baird | B60P 1/56 254/419 |
| 6,893,006 B2 | 5/2005 | Drake, III | |
| 6,994,325 B2 | 2/2006 | Riedl | |
| 7,055,859 B2 * | 6/2006 | Peveler | B60S 9/08 254/419 |
| 7,083,196 B2 | 8/2006 | Riedl | |
| 7,163,207 B2 | 1/2007 | Baird et al. | |
| 7,296,779 B2 | 11/2007 | Bakshi et al. | |
| 7,325,786 B2 | 2/2008 | Drake, III | |
| 7,377,488 B2 | 5/2008 | Schutt | |
| 7,380,825 B2 | 6/2008 | Peveler | |
| 7,398,959 B2 | 7/2008 | VanDenberg et al. | |
| 7,575,249 B2 | 8/2009 | Riedl | |
| 8,051,545 B2 | 11/2011 | Peveler | |
| 8,382,069 B2 | 2/2013 | Alguera et al. | |
| 2003/0006599 A1 * | 1/2003 | VanDenberg | B60S 9/08 280/766.1 |
| 2005/0202923 A1 | 9/2005 | Drake | |
| 2006/0043717 A1 | 3/2006 | Baxter | |
| 2008/0146397 A1 | 6/2008 | Drake | |
| 2012/0037862 A1 | 2/2012 | McCarthy et al. | |
| 2014/0077140 A1 * | 3/2014 | Baird | B60S 9/08 254/419 |
| 2014/0157917 A1 | 6/2014 | Oestreich et al. | |
| 2016/0264107 A1 * | 9/2016 | Riedl | B60S 9/08 |

FOREIGN PATENT DOCUMENTS

| | | |
|---|---|---|
| DE | 10017495 A | 2/2002 |
| EP | 401 101 A1 | 12/1990 |
| EP | 2233376 B1 | 2/2012 |
| JP | 3-31044 | 2/1991 |
| JP | 8-268240 A | 10/1996 |
| JP | 09071226 A | 3/1997 |
| JP | 2005280389 A | 3/2004 |
| WO | 99/54178 | 10/1999 |
| WO | 2004/096606 | 11/2004 |
| WO | 2004/098965 | 11/2004 |
| WO | 2009/074001 A1 | 6/2009 |
| WO | 2012/072389 | 6/2012 |

* cited by examiner

POWERED LANDING GEAR

CROSS REFERENCE TO RELATED APPLICATIONS

The present application claims priority of U.S. provisional application Ser. Nos. 61/938,940 filed Feb. 12, 2014, and 61/970,870 filed Mar. 26, 2014, for POWERED LANDING GEAR, which are hereby incorporated herein by reference in their entireties.

BACKGROUND OF THE INVENTION

The present invention is directed to a semitrailer landing gear, and in particular a powered landing gear having a multi-speed gearing system that automatically shifts between high and low gear ranges.

Semitrailers include landing gear for supporting the forward portion of the semitrailer when disconnected from a truck, with the landing gear including legs that raise and lower the semitrailer when connecting or disconnecting to the fifth wheel of the truck. The landing gear legs are raised for road travel when the semitrailer is connected to a truck, in which case the legs are retracted without a load. Conversely, when disconnecting the semitrailer the landing gear legs are extended into contact with a support surface to raise the semitrailer such that they are extended while supporting a significant load. Landing gear includes high and low gears for extension/retraction of the legs based on whether the legs are supporting a load or unloaded.

SUMMARY OF THE INVENTION

The present invention provides a powered landing gear that automatically shifts between high speed and low speed settings, as well as includes controls for automatically ceasing operation of the drive system when the landing gear leg is lowered or raised into position. The landing gear is further operable manually when desired by disengagement of the powered drive system.

In accordance with an aspect of the invention, a powered landing gear comprises a housing member and a telescoping leg member connected with the housing member, an internal gear assembly located within the housing member and configured to extend and retract the leg member, and a shaft extending from external of the housing member through the housing member and operatively connected with the internal gear assembly. The internal gear assembly includes a ring gear arranged to rotate about an axis that is transverse to the telescopic orientation of the leg member with the internal gear assembly configured to operate in a high speed setting and a low speed setting, and with the internal gear assembly configured to automatically shift from the high speed setting to the low speed setting. The landing gear further includes a drive system attached with the housing member and includes a drive motor and a drive gear, with the drive motor configured to drive the drive gear with the drive gear operatively driving the shaft.

In particular embodiments a driven gear is attached to the shaft, with the drive gear operatively driving the driven gear. A connecting gear may also be disposed between the drive gear and driven gear, where the connecting gear is configured to be selectively engaged and disengaged with the drive gear and driven gear. Still further, a handle is connected with the connecting gear, where the handle is configured to be selectively pulled by an operator to disengage the connecting gear from the drive gear and driven gear. A biasing member, such as a spring, may also be provided that is engaged with the connecting gear and configured to bias the connecting gear into engagement with the drive gear and driven gear.

The shaft may include or receive a hand operated crank, with the drive system being selectively disengaged such that the drive motor is prevented from driving the shaft, and with the shaft being rotatable by the crank when the drive system is disengaged. The crank may be mounted to the shaft by a slip ring connector that enables the shaft to rotate independently of the crank when the drive system is engaged.

The powered landing gear further includes an up limit switch and an actuator, said actuator configured to trip the limit switch when the leg member is moved by the drive system into an elevated position, with the limit switch configured to stop operation of the drive motor when tripped.

Still further or alternatively, the powered landing gear includes a down limit switch and associated down limit switch actuator, where the down limit switch actuator is configured to trip the down limit switch when the leg member is moved by the drive system into an extended position, with the down limit switch configured to stop operation of the drive motor when tripped. The powered landing gear further includes an elevation member interconnected with the housing member and leg member, where the elevation member both shifts the internal gear assembly into the low speed setting and trips the down limit switch actuator when the leg member engages a support surface. In a particular embodiment the down limit switch actuator moves with or is attached to an actuator member for shifting the internal gear assembly into the low speed setting, with the elevation member being configured to move the actuator member and the actuator member moving the down limit switch actuator.

The powered landing gear further includes an electrical circuit, wherein the limit switches and drive motor are electrically connected with the circuit, and where the circuit operates the drive motor for a predetermined time period upon the down limit switch being tripped.

These and other objects, advantages, purposes and features of this invention will become apparent upon review of the following specification in conjunction with the drawings.

DESCRIPTION OF THE PREFERRED EMBODIMENTS

Figure 1:
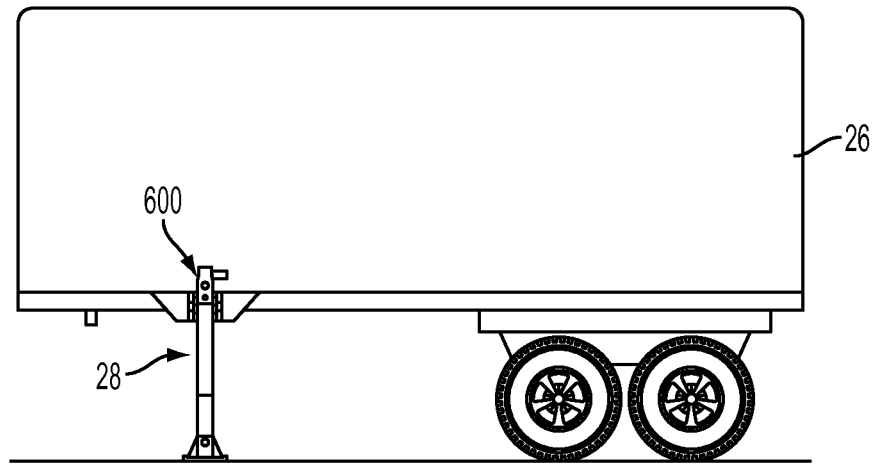
FIG. 1 is an illustration of a semitrailer incorporating the powered landing gear in accordance with the present invention.
Figure 2:
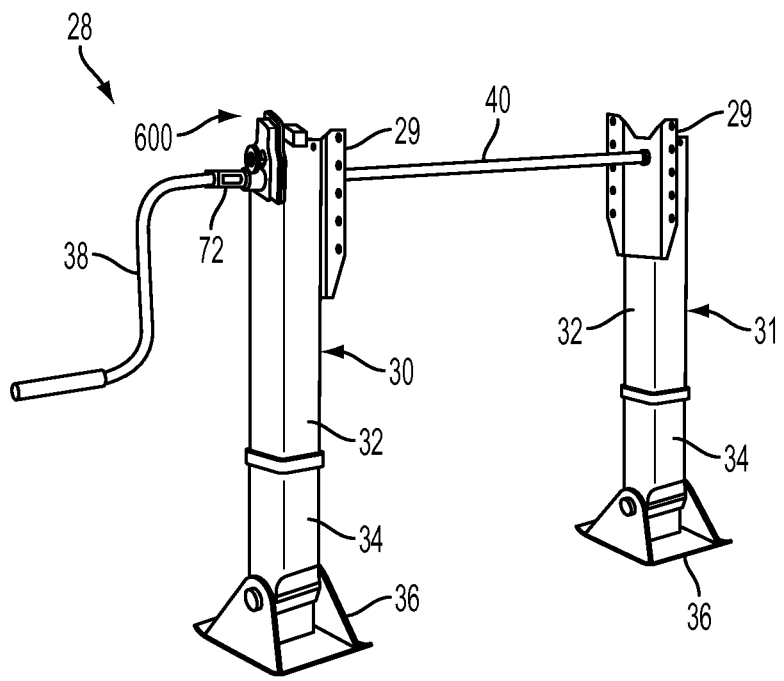
FIG. 2 is a perspective view of the pair of interconnected landing gear removed from the semitrailer of FIG. 1.

The present invention will now be described with reference to the accompanying figures, wherein the numbered elements in the following written description correspond to like-numbered elements in the figures. FIG. 1 discloses a semitrailer 26 supported by a forwardly located powered landing gear assembly 28, with FIG. 2 disclosing the assembly 28 removed from semitrailer 26. Assembly 28 includes a powered landing gear 30 connected with a second landing gear 31 via transverse shaft 40 that are both connected to trailer 26 by flanges 29, with each landing gear 30, 31 including a housing 32 and a telescoping leg 34 having a pad or foot 36 for contacting a support surface.

Powered landing gear 30 includes a power drive system or assembly 600 that can be selectively engaged or disengaged that, when engaged, may be selectively activated by an operator to drive a gear assembly 42 located internally of housing 32 for extending and retracting leg 34 from housing 32. Alternatively, when power drive system 600 is disengaged, hand crank 38 may be used to drive gear assembly 42 for raising and lowering leg 34. Leg 34 of landing gear 31 is correspondingly extended and retracted relative to its housing 32 via shaft 40. Landing gear 30 thus enables an operator to extend and retract legs 34 automatically or by hand. Still further, as discussed in more detail below, gear assembly 42 provides both a high gear or high speed for rapidly extending and retracting leg 34 when there is no load on leg 34, as well as a low gear or low speed that is reduced from the input rotation provided to gear assembly 42 for extending and retracting leg 34 when loaded. Gear assembly 42, moreover, automatically switches between high and low gears based on gear assembly 42 sensing or reacting to whether or not a load is applied to leg 34. Gear assembly 42 in the illustrated embodiment may comprise a planetary gear assembly or system that is disclosed in commonly owned U.S. patent application Ser. No. 14/096,731 entitled DUAL-SPEED AUTO-SHIFT LANDING GEAR, and corresponding international patent application PCT/US2013/073134, both of which were filed on Dec. 4, 2013 and are hereby incorporated by reference in their entireties. Landing gear 31 can also include an internal gear assembly 42, or alternatively can comprise a single speed slave landing gear.

Figure 3A:
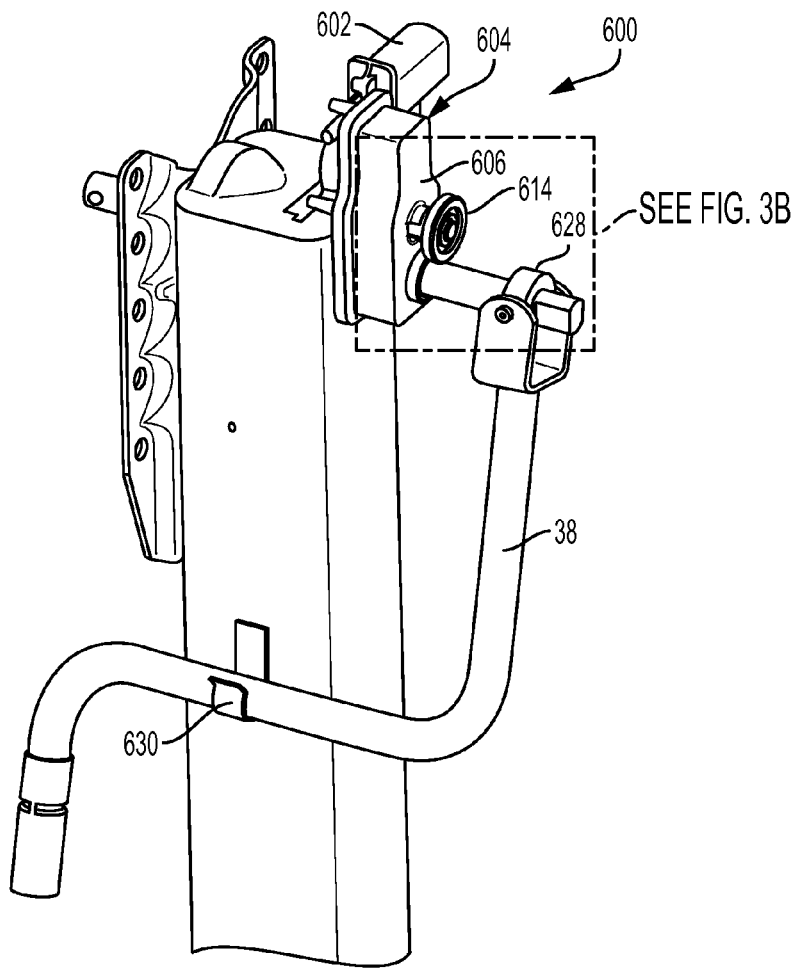
FIG. 3A is a perspective view of a powered landing gear in accordance with the present invention shown with the power drive system engaged whereby it can selectively drive the internal gear assembly of the landing gear.
Figure 3B:
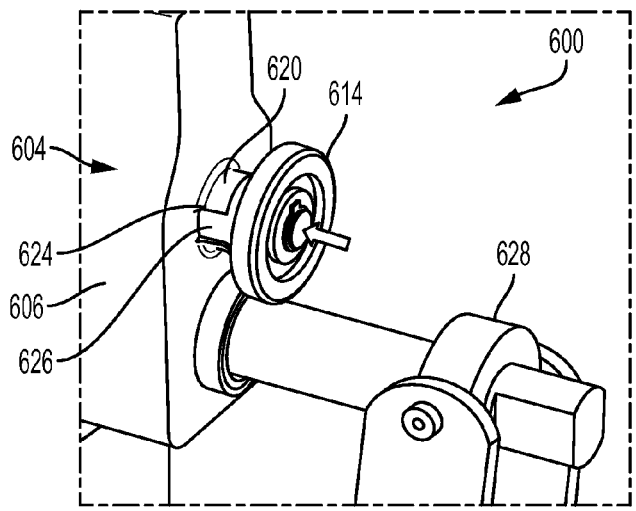
FIG. 3B is a close up partial perspective view of FIG. 3A.
Figure 4A:
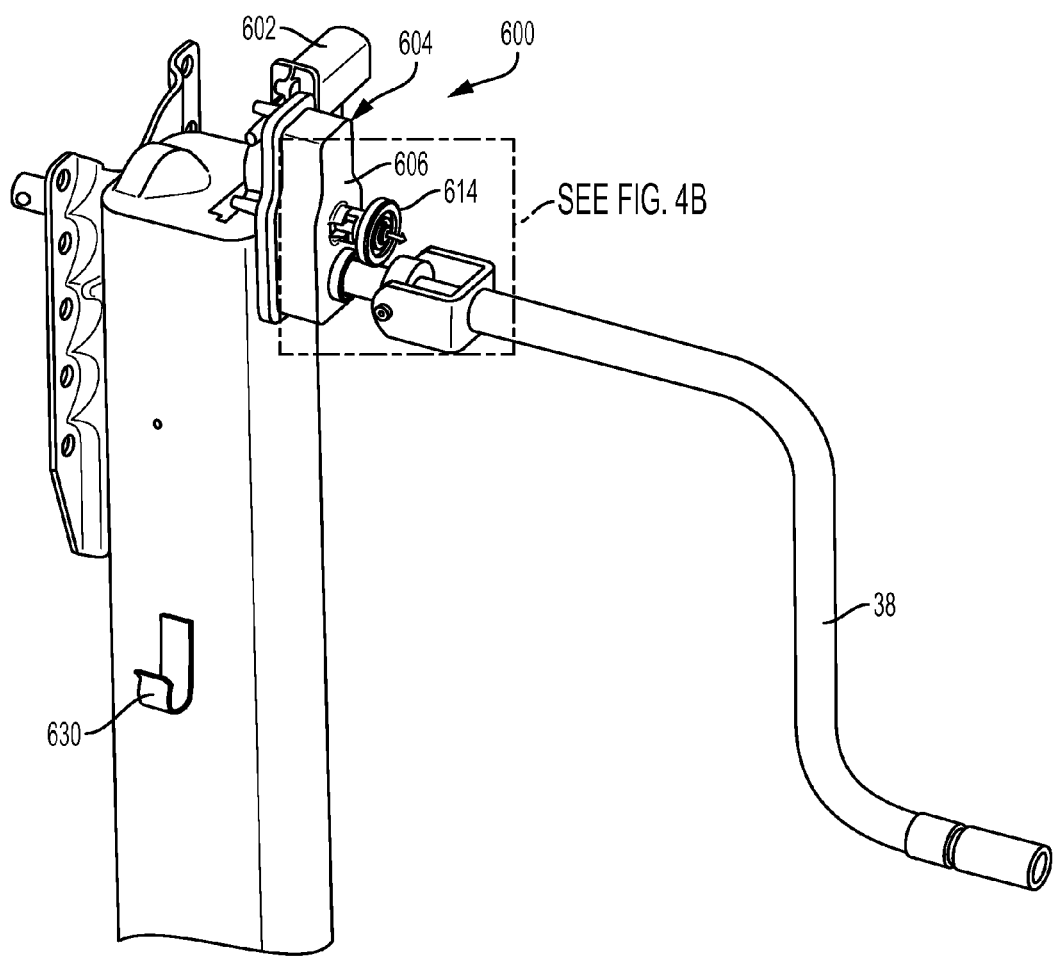
FIG. 4A is a perspective view showing the power drive system disengaged from the gear assembly such that the gear assembly may be driven by the hand crank.
Figure 4B:
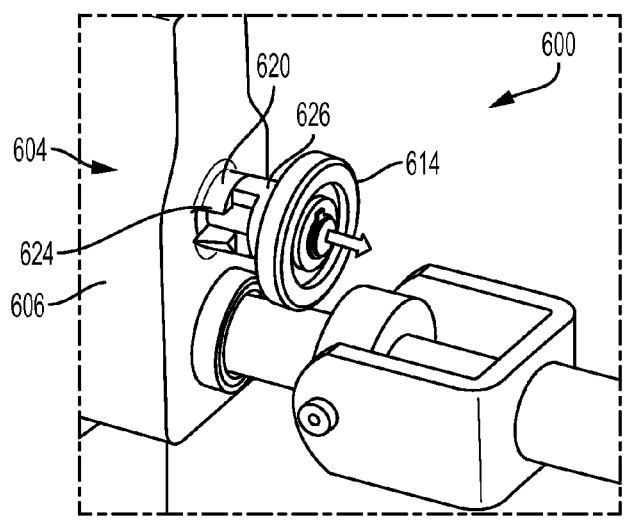
FIG. 4B is a close up partial perspective view of FIG. 4A.

Referring now to FIGS. 3 and 4, power drive system 600 of powered landing gear 30 includes a drive motor 602 and a power gearbox 604. In the illustrated embodiment, drive motor 602 comprises a 12V motor having a worm gear that drives a ring gear (not shown) that is operatively mounted in parallel to a drive gear 608 on shaft 609, discussed below. It should be appreciated that alternative arrangements, constructions and sizes of a drive motor may be used within the scope of the present invention.

Figure 5:
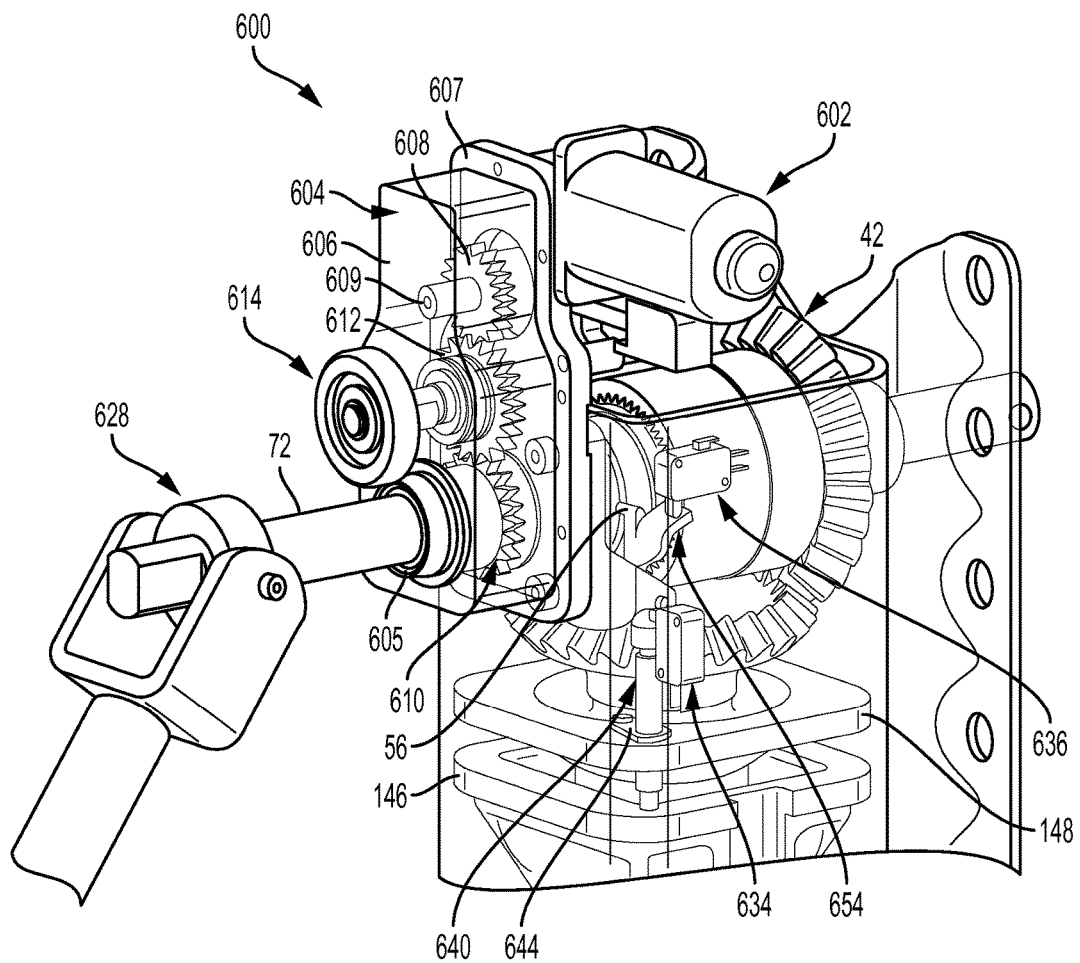
FIG. 5 is a partial upper perspective view of the powered landing gear of FIG. 3 showing the power drive system used to drive the gear assembly located within the landing gear housing.
Figure 6:
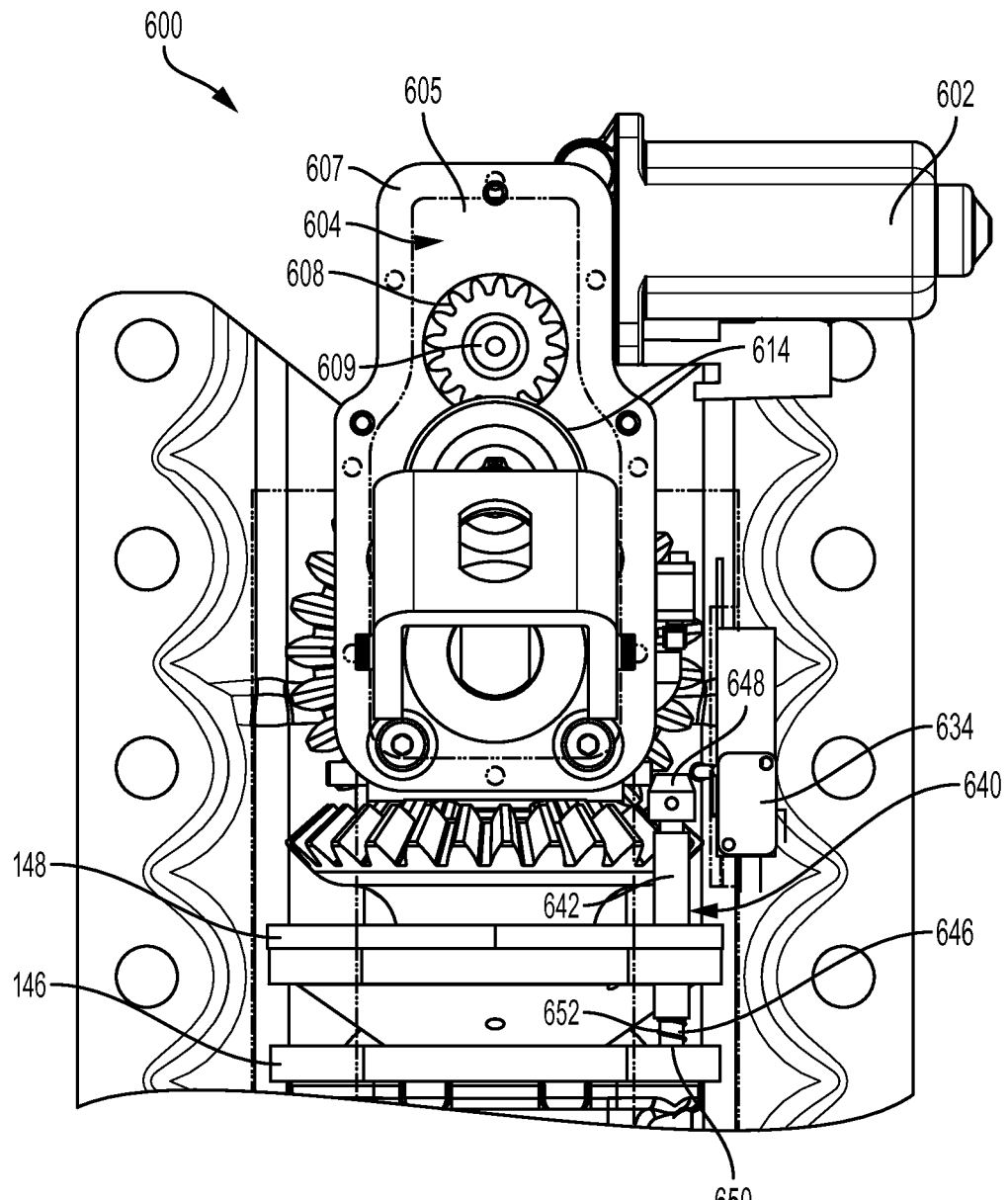
FIG. 6 is a partial front view of the powered landing gear of FIG. 3.
Figure 7:
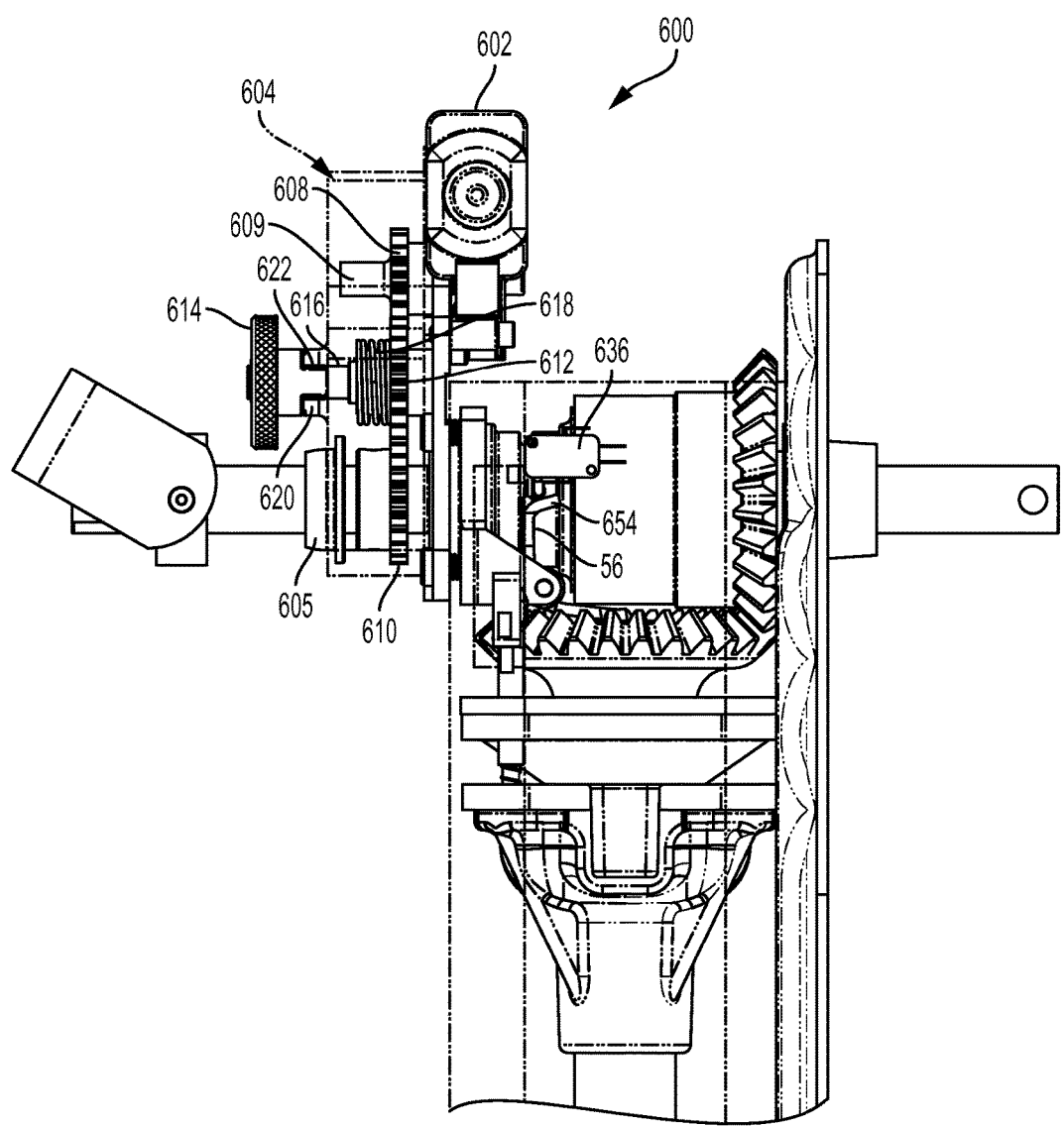
FIG. 7 is a partial right side view of the powered landing gear of FIG. 3.

With further reference to FIGS. 5-7, gearbox 604 includes a housing 606 having a flange 607, with a lower portion of housing 606 being mounted to housing 32 of landing gear 30 by way of fasteners affixed through flange 607 and with the drive motor 602 being mounted to an upper portion of housing 606. Shaft 72 extends into housing 606 at bushing 605, with housing 606 enclosing the drive gear 608, a driven gear 610 and a connecting or transfer gear 612 that is disposed between the drive gear 608 and driven gear 610. Driven gear 610 is operatively connected or mounted to shaft 72, and rotation of shaft 72 provides input torque to internal gear assembly 42 of landing gear 30 for extending and retracting leg 34. Drive gear 608 is operatively connected to drive motor 602 whereby motor 602, when activated, can drive shaft 72 through the connection of drive gear 608 with connecting gear 612 and, in turn, driven gear 610. Motor 602 may be driven in either direction to thereby rotate drive gear 608 in either direction to extend or retract leg 34 relative to housing 32 of landing gear 30 via gear assembly 42, where gear assembly 42 is discussed in more detail below.

As noted, leg 34 of landing gear 30 may alternatively be extended and retracted relative to housing 32 independently of power drive system 600 by disengagement of power drive system 600 from shaft 72 and use of crank 38 to manually rotate shaft 72. Power drive system 600 includes a disengagement member for disconnecting power drive system 600, which in the illustrated embodiment comprises a knurled knob or handle 614 connected or attached with connecting gear 612 via a shaft 616. When handle 614 is pushed in relative to housing 606, as shown in FIGS. 3, 5 and 7, connecting gear 612 is operatively engaged with drive gear 608 and driven gear 610 to thereby transmit power from drive gear 608 to driven gear 610. Power drive system 600 is conversely disengaged from shaft 72 by selectively disengaging connecting gear 610 from drive gear 608 and driven gear 610 by pulling handle 614 out relative to housing 606, as shown in FIG. 4, where pulling handle 614 out moves connecting gear 610 relative to its axis of rotation to thereby disengage the teeth of connecting gear 610 from the teeth of drive gear 608 and driven gear 610.

As understood from FIG. 7, gearbox 604 includes a biasing member, which in the illustrated embodiment comprises a spring 618 that presses against an inside surface of housing 606 to normally bias connecting gear 610 into engagement with drive gear 608 and driven gear 610. Housing 606 further includes an external protuberance or projection 620 disposed about the opening 622 in housing 606 through which shaft 616 of handle 614 extends, with projection 620 including notches or slots 624 (one shown in FIGS. 3 and 4). Handle 614 correspondingly includes radial projections or keys 626 that are positioned within slots 624 when connecting gear 612 is engaged with drive gear 608 and driven gear 610. When handle 614 is pulled out to disengage power drive system 600 by disengaging connecting gear 612 from drive gear 608 and driven gear 610, handle 614 may be rotated, such as ninety degrees, to misalign keys 626 from slots 624 to thereby prevent spring 618 from unintentionally reengaging connecting gear 612 with drive gear 608 and driven gear 610.

Crank 38 is connected to shaft 72 by a slip ring connector 628 that allows shaft 72 to rotate without movement of crank 38. Crank 38 can therefore be retained in holder 630 mounted to housing 32 while leg 34 is extended and retracted via power drive system 600. When power drive system 600 is disengaged, crank 38 may be moved into the orientation of FIG. 4 for manually raising and lowering leg 34.

The powered operation of landing gear 30 when power drive system 600 is engaged will now be discussed with reference to FIGS. 5-8. When power drive system 600 is engaged such that connecting gear 612 is engaged with drive gear 608 and driven gear 610, an operator may selectively actuate drive motor 602 to raise and lower leg 34 via an electrical switch 632. (See FIG. 8). It should be appreciated that electrical switch 632 can be mounted in various locations, such as a three-position electrical switch located adjacent power drive system 600 or even on drive motor itself, with the positions corresponding to off and rotation in either of two directions and with the motor 602 wired for receiving battery power from a tractor (not shown).

Figure 8:
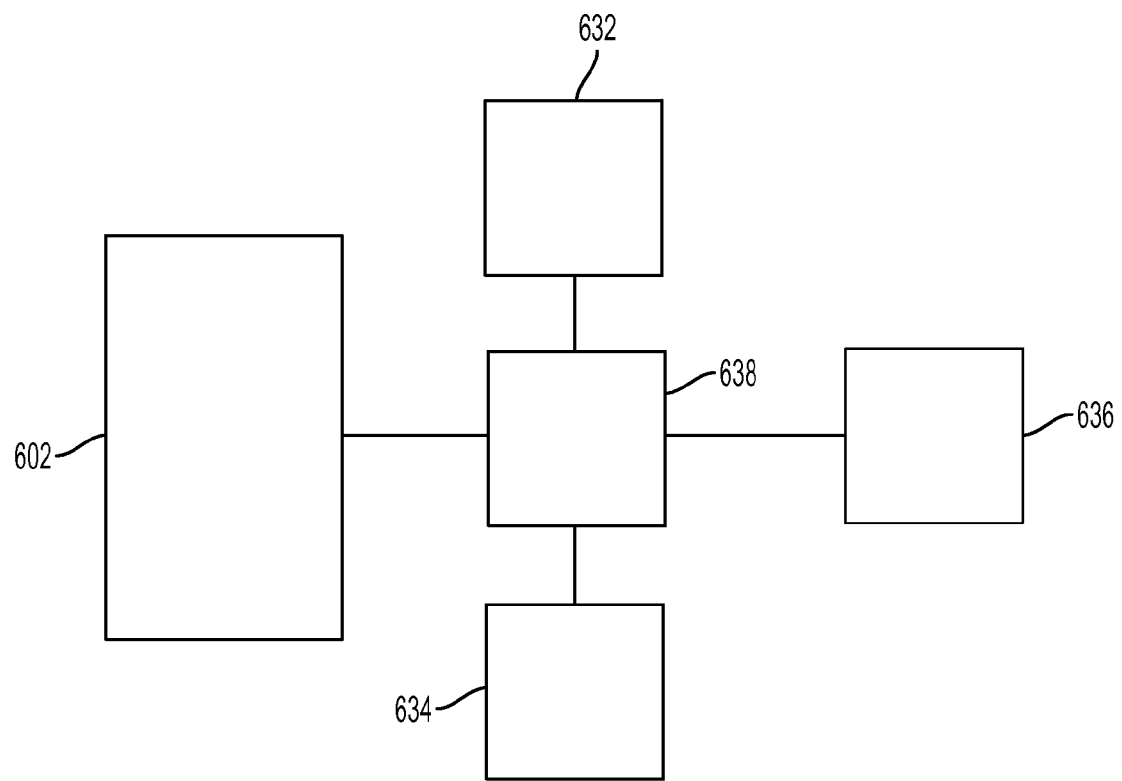
FIG. 8 is a schematic illustration of an electrical circuit for controlling operation of the power drive system.

As understood with reference to FIGS. 5 and 8, a pair of limit switches 634, 636 are provided that interact with electrical circuit 638 to control operation of power drive system 600. Limit switch 634 is associated with the upward movement of leg 34 and thereby comprises an "up" limit switch that is actuated by a limit switch actuator 640 that includes a sleeve or guide 642 held by a retainer 644 to the floor base 148 that is fixedly mounted within housing 32, with guide 642 being mounted at an aperture in base 148. A pin 646 having a head 648 and a lower end 650 is movably contained within guide 642 and extends through base 148. As understood from FIG. 7, a biasing member in the form of spring 652 is provided that operates to bias pin 646 vertically downward relative to its axial length. Landing gear 30 includes a lift nut 146 that is affixed to leg 34 within which the elevation screw for the landing gear 30 rotates to raise and lower leg 34, where FIGS. 5-7 shown lift nut 146 in its elevated orientation associated with leg 34 having been raised up such that lift nut 146 contacts lower end 650 of pin 646. Continued movement of lift nut 146 will cause head 648 to trip limit switch 634, with limit switch 634 then causing power to drive motor 602 to be turned off such that power drive system 600 ceases raising leg 34. Thus, when gear motor 602 is engaged and then activated by a user to raise leg 34, power drive system 600 will raise leg 34 until actuator 640 trips limit switch 634 to cease motion of leg 34.

Limit switch 636 is associated with downward movement of leg 34 and thereby comprises a "down" limit switch that operates in connection with circuit 638 to turn power drive system 600 off when leg 34 is sufficiently or fully lowered. Limit switch 636 is actuated by a down limit switch actuator 654 that moves when leg 34 contacts a support surface. In the illustrated embodiment, actuator 654 is formed as a tab attached to and extending from an actuator member 56 associated with gear assembly 42, where actuator member 56 moves to shift the gear assembly 42 between a high gear and low gear operation when leg 34 contacts a support surface. The operation of actuator member 56 relative to the automatic shifting of gear assembly 42 between high and low gear is discussed in the incorporated U.S. patent application Ser. No. 14/096,731 and corresponding international patent application PCT/US2013/073134, and in more detail below.

As understood from FIG. 8, down limit switch 636 is connected with circuit 638. Circuit 638 includes a timer portion or component that is triggered by down limit switch 636 when actuator 654 actuates the down limit switch 636. Upon triggering the timer portion of circuit 638, circuit 638 will continue to operate drive motor 602 for a predetermined period of time sufficient to extend leg 34 from housing 32 of landing gear 30. For example, the predetermined period of time can be established to ensure that trailer 26 is appropriately raised or disengaged from the fifth wheel of a truck.

Figure 8A:
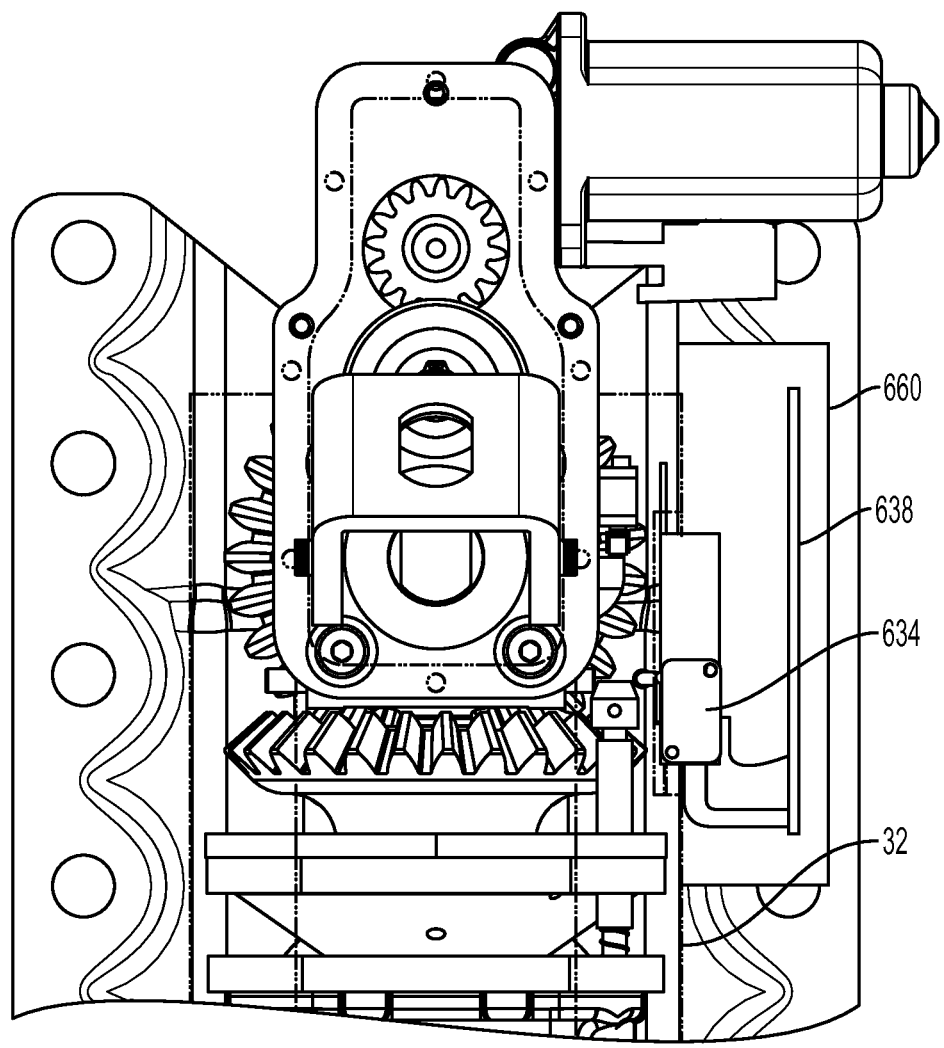
FIG. 8A is a partial front view of an embodiment of a wirelessly controlled powered landing gear in accordance with an aspect of the present invention.
Figure 8B:
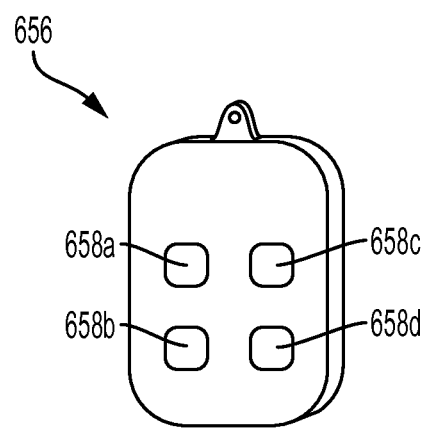
FIG. 8B is a controller for operating the powered landing gear of FIG. 8A.

Still further, with reference to FIGS. 8A-8D, power drive system 600 may be additionally or alternatively constructed to operate wirelessly, such as via circuit 638. In such an embodiment switch 632 may or may not be included with an alternative controller being employed. For example, a wireless controller 656 is illustrated in FIG. 8B for operation of landing gear 30, where controller 656 is constructed in the form of a handheld key fob that may be used to hold or carry vehicle keys, with controller 656 including multiple buttons 658a, 658b, 658c and 658d. Controller 656 may thereby be used by an operator to remotely raise and lower leg 34 of landing gear 30. Button 658a comprises an up or lift button, wherein the pressing of button 658a by an operator initiates lifting or raising of leg 34 by way of drive motor 602. As noted above, leg 34 will continue to raise until actuator 640 trips limit switch 634 to cease motion of leg 34. Alternatively, while leg 34 is being raised, an operator may press button 658b to automatically stop the lifting of leg 34 prior to leg 34 having reached its fully raised position, where pressing of button 658b during the lifting cycle will cause motor 602 to be shut off.

Correspondingly, the pressing of button 658c on controller 656 by an operator will cause leg 34 to be automatically lowered, such as from the fully up position or otherwise. Once activated, as discussed above, leg 34 will continue to be lowered until actuator 654 triggers down limit switch 636, at which point circuit 638 will continue to operate drive motor 602 for a predetermined period of time sufficient to extend leg 34 from housing 32 of landing gear 30. Alternatively, while leg 34 is being lowered, an operator may press button 658d to automatically stop the lowering of leg 34 prior to leg being fully lowered, where pressing of button 658d during the lowering cycle will cause motor 602 to be shut off.

Controller 656 and circuit board 638 may be conventionally constructed, with controller 656 operating as a radio transmitter and circuit board 638 including or operating as a receiver. It should be understood that alternative wireless communication technology may be employed, such as, but not limited to, Wi-Fi, Bluetooth, or the like. FIG. 8A discloses the inclusion of circuit board 638 mounted internally of housing or cover 660, where cover 660 comprises an enclosure that is mounted to the exterior of housing 32 of landing gear 30. Limit switches 634, 636 are mounted to the exterior of housing 32 and connected with circuit board 638, with housing 32 including slots through which limit switches 634, 636 are able to be actuated by actuators 640, 654, respectively. Cover 660 thereby protects circuit 638 and limit switches 634, 636 from damage, moisture and the like.

Figure 8C:
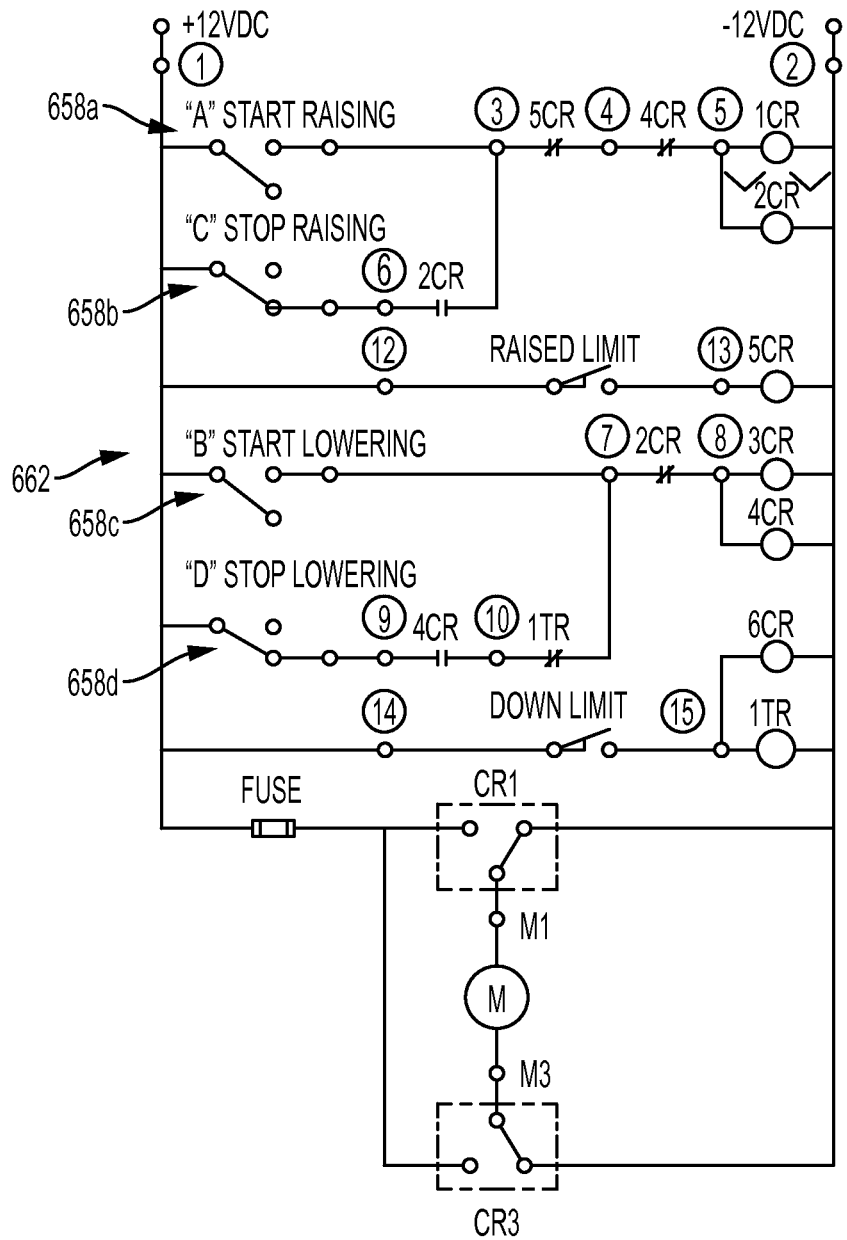
FIG. 8C is a wiring control diagram for the powered landing gear of FIG. 8A.
Figure 8D:
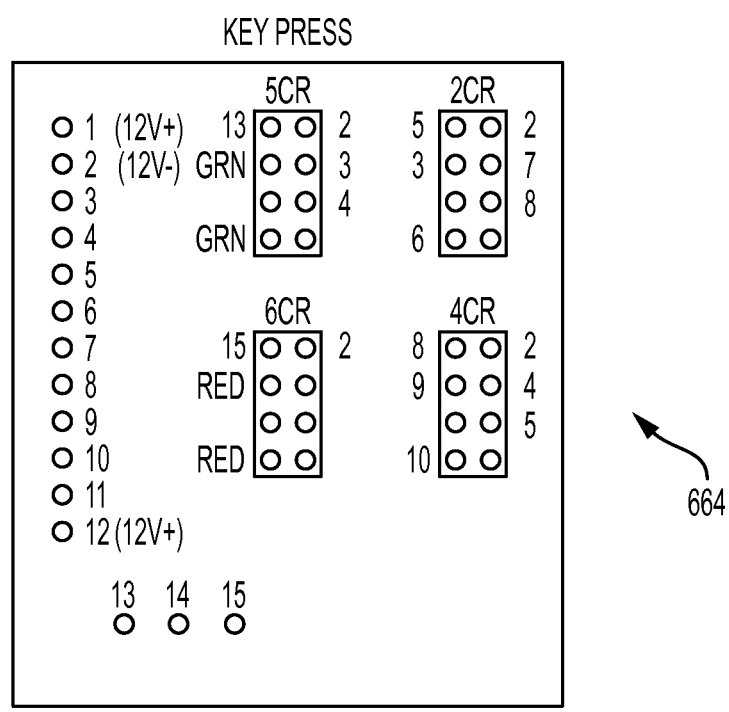
FIG. 8D is a circuit board for the powered landing gear of FIG. 8A.
Figure 9:
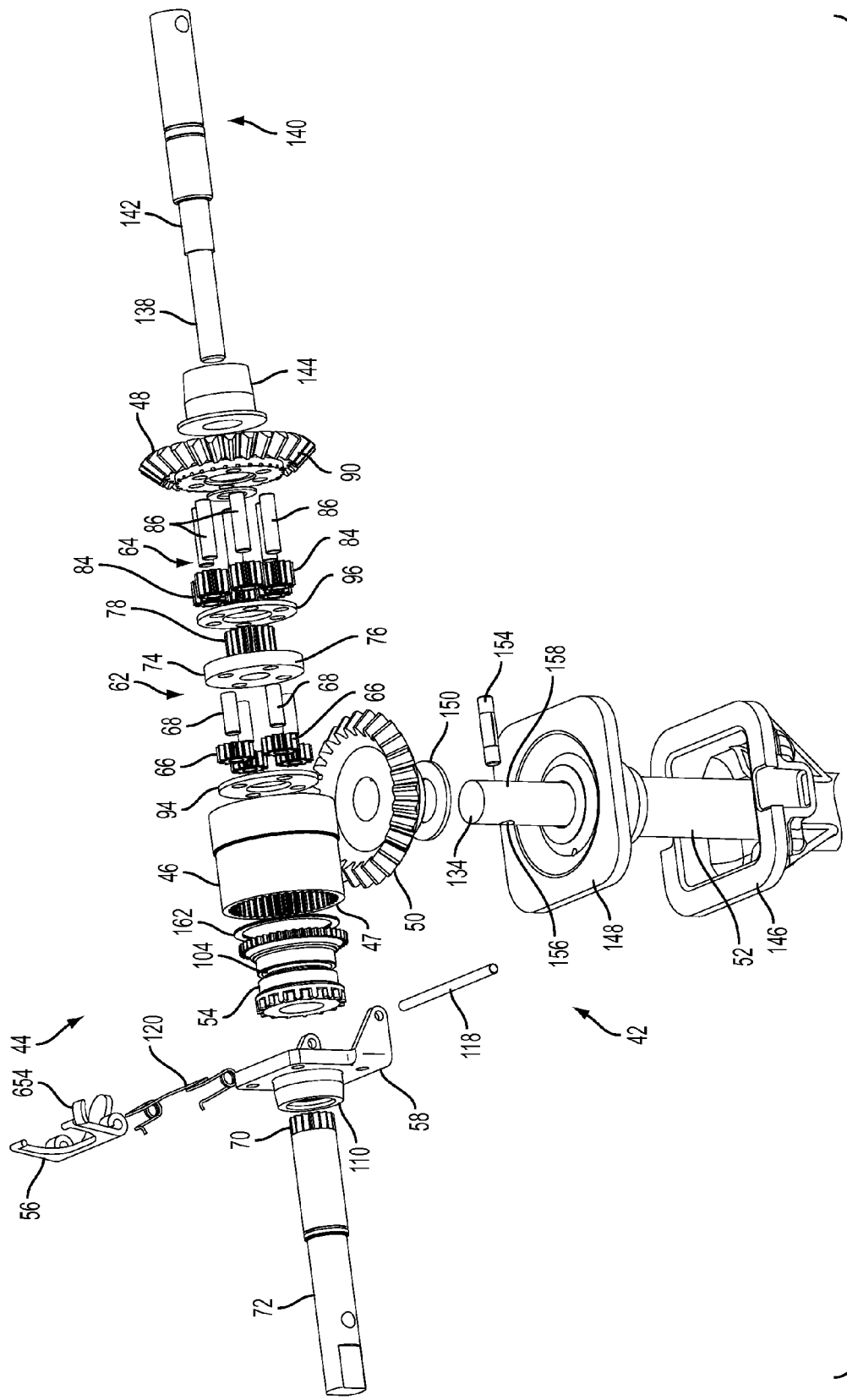
FIG. 9 is an exploded perspective view of the gear assembly of FIG. 5.

FIGS. 8C and 8D discloses a wiring diagram 662 and circuit board 664 for the wireless control system discussed above with regard to FIGS. 8A and 8B. As understood from FIG. 8C, the associated buttons 658a-658d are indicated in association with the various control relays identified as "CR."

The operation of internal gear assembly 42 of landing gear 30 will now be discussed with further reference to FIGS. 9-14B. As noted, landing gear 30 includes automatically shifting gearbox or gear assembly 42, with gear assembly 42 being contained within housing 32. As discussed in detail below, gear assembly 42 provides both a high gear or high speed for rapidly extending and retracting leg 34 when there is no load on leg 34, as well as a low gear or low speed that is reduced from the input rotation provided by crank 38 for extending and retracting leg 34 when loaded. Moreover, gear assembly 42 automatically switches between high and low gears based on gear assembly 42 sensing or reacting to whether or not a load is applied to leg 34. That is, gear assembly 42 operates in a low gear when foot 36 is on a support surface and landing gear 30 is supporting weight of the semitrailer 26 and, conversely, gear assembly 42 operates in a high gear when foot 36 is not in contact with the support surface and landing gear 30 is not supporting the weight of the semitrailer 26, such as when the semitrailer 26 is joined to a fifth wheel of a truck and leg 34 is being retracted for road travel or when lowering the leg 34 prior to contact with the support surface when disconnecting semitrailer 26 from a truck. The shifting between high and low gears occurs automatically based on the state of the loading, without input from or adjustment by an operator of crank 38.

As understood from FIGS. 5, 9, 10A and 10B, gear assembly 42 comprises a planetary gear system or assembly 44 to achieve the necessary reduction in the low gear state, as well as an associated cylindrical ring gear 46 that is directly or concurrently driven when operating in the high gear state, with a set of drive gears comprising bevel gears 48, 50 being used to transmit torque to an elevation member configured as an elevation or jack screw 52 connected with landing gear let 34 to thereby extend and retract leg 34.

As discussed in more detail below, ring gear 46 is selectively actuated by way of an engagement member or shift member 54 that axially moves relative to ring gear 46 in connection with automatic shifting between high and low gears. When gear assembly 42 is in high gear, ring gear 46 concurrently rotates when an operator turns crank 38, whereby there is no reduction because bevel gears 48, 50 power elevation screw 52 by direct drive. (See FIG. 10A). Upon foot 36 of leg 34 contacting the support surface, gear assembly 42 automatically shifts into low gear by elevation screw 52 translating axially relative to the orientation of housing 32, with elevation screw 52 driving an actuator member 56 to move shift member 54 into engagement with actuator mount 58 to thereby prevent rotation of shift member 54. When so moved, shift member 54 remains engaged with ring gear 46 such that ring gear 46 is also prevented from rotating. As discussed below, rotation of crank 38 then causes components of gear assembly 42 to operate within the interior 60 of ring gear 46 to provide the gear reduction needed under loaded conditions. (See FIG. 10B).

In the embodiment of FIGS. 5-10B, the planetary gear assembly 44 of gear assembly 42 includes both a primary planetary gear assembly 62 and a secondary planetary gear assembly 64 that are interconnected via the sharing of a gear member 74 and are assembled within ring gear 46. Primary planetary gear assembly includes multiple primary planet gears 66 that are each mounted for rotation on separate axles 68 and mesh with a primary sun gear 70 formed on the end of the input shaft 72, where crank 38 is selectively attached to the opposite end of input shaft 72 for imparting driving rotation to gear assembly 42. In the embodiment shown four primary planet gears 66 are utilized, but alternative numbers could be utilized. Axles 68 are mounted at one end to gear member 74 that comprises a combined primary carrier 76 and secondary sun gear 78, with axles 68 being mounted within holes 80 of primary carrier 76 to extend outwardly from face 82 of carrier 76. As discussed in more detail below, the opposite ends of axles 68 extend beyond primary planet gears 66 whereby the axles are selectively engaged by shift member 54.

Primary carrier 76 and secondary sun gear 78 of gear member 74 rotate together, with gear member 74 thus forming part of both the primary and secondary planetary gear assemblies. Secondary planetary gear assembly further includes multiple secondary planet gears 84 that are each mounted for rotation on separate axles 86 and mesh with secondary sun gear 78. Axles 86 are mounted within holes on face 90 of input drive bevel gear 48, whereby input bevel gear 48 comprises a secondary carrier 92 of the secondary planetary gear assembly. In the embodiment shown six secondary planet gears 66 are utilized, but alternative numbers could be utilized.

A pair of support rings 94, 96 are additionally provided that receive the axles 68 and 86. Support ring 94 includes multiple holes for receiving the axles 68 of the primary planetary gear assembly 62 on the opposite side of primary planet gears 66 relative to primary carrier 76. Similarly, support ring 96 includes multiple holes for receiving the axles 86 of the secondary planetary gear assembly 64 on the opposite side of secondary planet gears 84 relative to secondary carrier 92 of input bevel 48. Rings 94, 96 operate to provide rigidity to the assembly of the primary and secondary planetary gear assemblies, respectively.

Figure 11A:
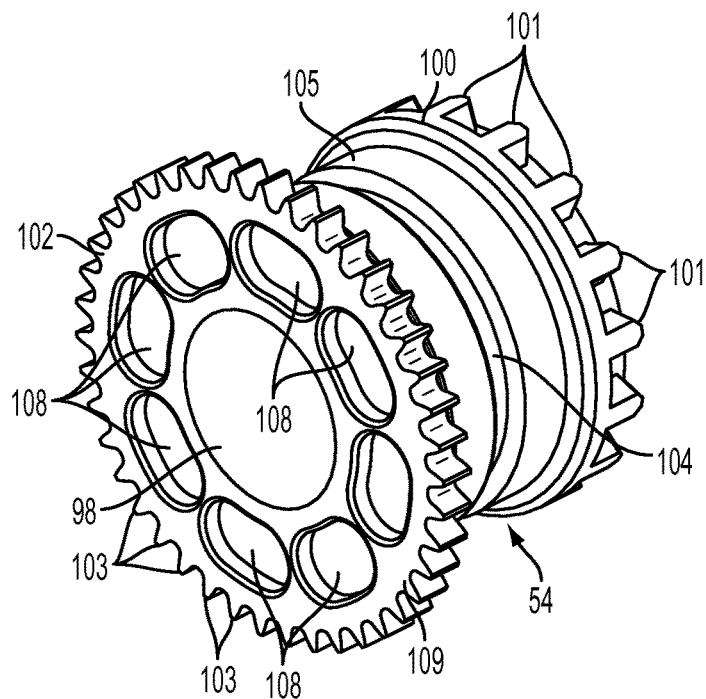
FIGS. 11A and 11B are opposite end perspective views of a shift member of the gear assembly of FIG. 5.
Figure 11B:
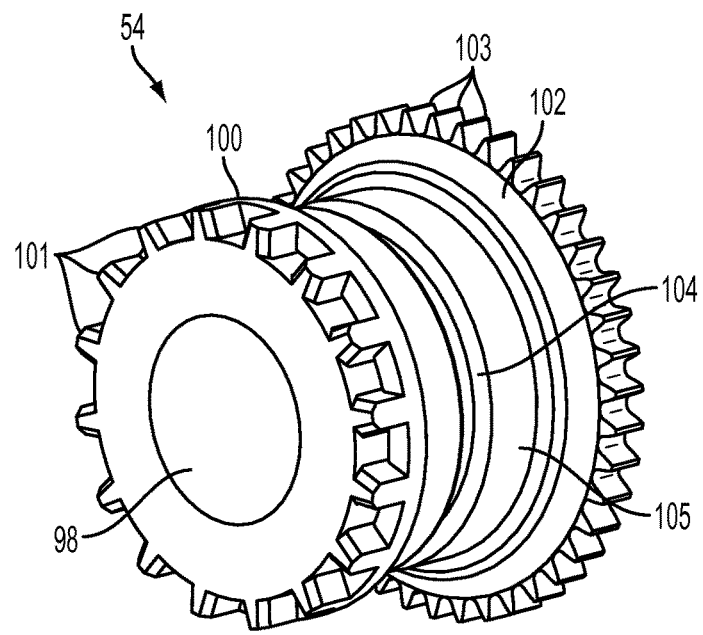

As noted, gear assembly 42 further includes shift member 54, where shift member 54 comprises and operates as a shift dog or dog clutch. With reference to FIGS. 11A and 11B, shift member 54 is shown to include a central through hole 98 whereby it is slidingly mounted to input shaft 72. Shift member 54 further includes a first geared end 100, a second geared end 102 and a circumferential groove 104 located between geared ends 100 and 102, where groove 104 is formed in a central location 105 of shift member 54 that has a smaller diameter than either of geared ends 100, 102. In the embodiment shown, as discussed in more detail below, geared end 100 includes teeth 101 and geared end 102 includes teeth 103, with teeth 103 of geared end 102 engaging internal circumferentially disposed gear teeth 47 located within the interior 60 of ring gear 46. As thus understood, ring gear 46 comprises an internal gear. Still further, teeth 101 of geared end 100 selectively engage with a lock member or receptacle formed as a mating gear 106 (FIGS. 14A and 14B) that in the illustrated embodiment is formed as part of actuator mount 58, where mating gear 106 comprises a spline gear. It should be appreciated that the lock member need not be constructed as a mating spline gear 106 in order to operate and that alternative shapes, structures and configurations on shift member 54 and lock member may be employed for preventing rotation of shift member 54. Shift member 54 further includes multiple elongate apertures 108 located on face 109 of first geared end 102 where apertures 108, as also described in more detail below, selectively receive ends of axles 68 extending beyond primary planet gears 66 mounted thereon.

Referring now to FIGS. 12-14B, in addition to mating gear 106, actuator mount 58 includes an input bearing 110 for receiving input shaft 72, and a mounting plate 112 with holes 113 for affixing mount 58 to the interior of housing 32. Actuator mount 58 further includes a pair of extending tabs or flanges 114 with holes 115 with actuator 56 being joined to actuator mount 58 between flanges 114. In particular, actuator 56 includes mounting holes 116 where a pivot pin or shaft 118 (FIG. 9) is positioned within holes 115 on flanges 114 and mounting holes 116 of actuator 56 when actuator 56 is positioned between flanges 114 to retain actuator 56 to actuator mount 58. A biasing member constructed as a torsion spring 120 (FIG. 13) is joined to actuator mount 58, with spring 120 including arms 122, coiled openings 124 and members 126. Coiled openings 124 are disposed over ends of pin 118 with arms 122 engaging flanges 114 whereby members 126 of spring 120 press against portions of actuator 56 as discussed below to provide a downwardly pivoting biasing force to actuator 56.

Figure 12:
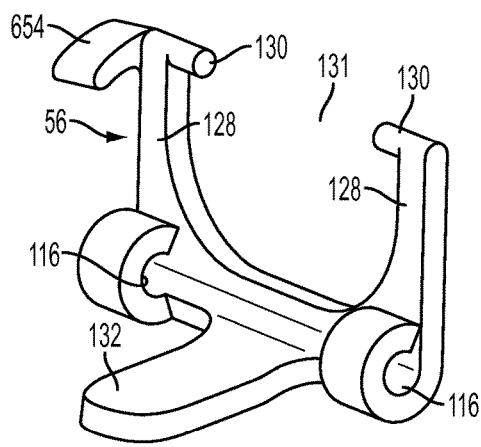
FIG. 12 is a perspective view of an actuator of the gear assembly of FIG. 5.
Figure 13:
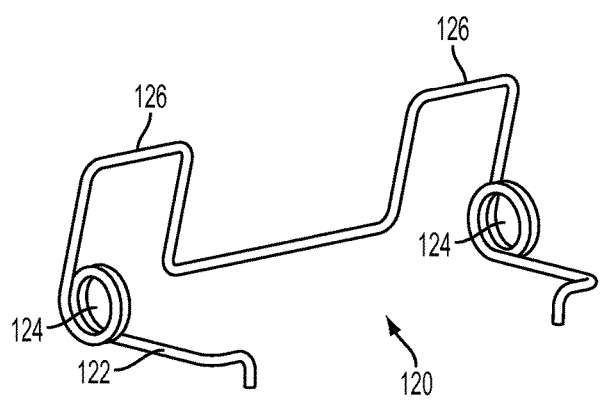
FIG. 13 is a perspective view of a biasing member used with the actuator of FIG. 12.
Figure 14A:
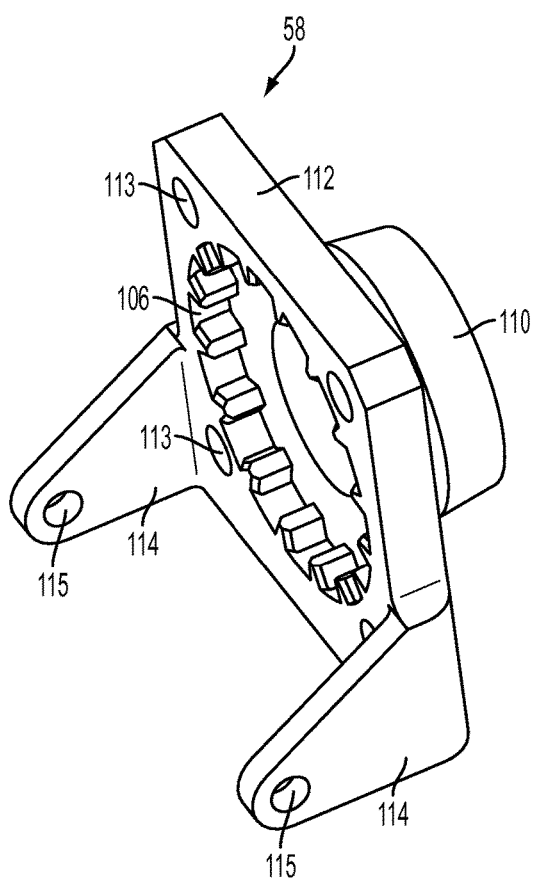
FIG. 14A is a perspective view of an actuator mount to which the actuator of FIG. 12 is joined.
Figure 14B:
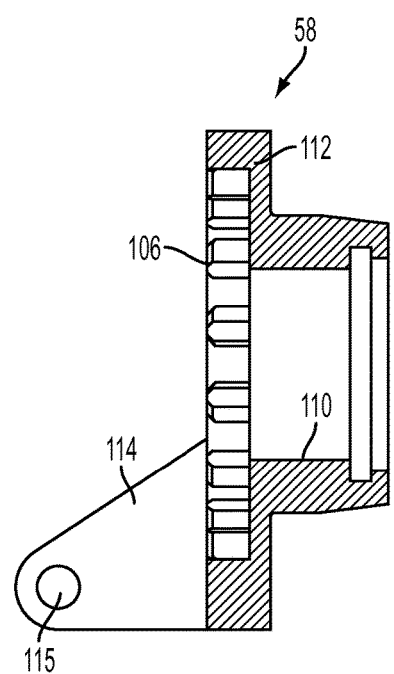
FIG. 14B is a side cross sectional view of the actuator mount of FIG. 14A.

With specific reference to FIG. 12, actuator 56 further includes a pair of arms 128 with inwardly disposed projections 130, where arms 128 define an opening 131 there between for receiving shift member 54 when assembled. Actuator further includes an additional outwardly projecting tab or arm 132 where arms 128 form an approximately 110 degree angle relative to tab 132 in the illustrated embodiment.

When gear assembly 42 is assembled, arms 128 of actuator 56 are disposed about central portion 105 of shift member 54, with projections 130 being disposed within groove 104. Spring 120 is assembled to actuator mount 58 such that members 126 are disposed between plate 112 and arms 128 whereby members 126 act on arms 128 to pivot actuator 56 about shaft 118 such that tab 132 is downwardly biased. Spring 120 thus correspondingly biases shift member 54 to be disengaged from mating gear 106 via projections 130 acting on shift member 54 in groove 104. As understood from FIGS. 10A and 10B, geared end 102 of shift member 54 is disposed within ring gear 46 such that spring 120 biases shift member 54 into ring gear 46. When so biased, shift member 54 engages the axles 68 of the primary planet gears 66, with the ends of the axles 68 being received within the apertures 108 of shift member 54 in the high gear position.

Referring again to FIGS. 9-10B, input shaft 72 includes a cavity 136 into which an end 138 of output shaft 140 is inserted. Shift member 54 is slidably disposed over input shaft 72 and gear member 74 is disposed over a recessed portion 142 of output shaft 140, where portion 142 has a larger diameter than that of end 138. Still further, input bevel 48 is mounted to the largest diameter portion of output shaft 140 with input bevel 48 including a key groove for mating with a key on shaft 140 whereby input bevel 48 rotates with shaft 140. When assembled, output shaft 140 is further supported within an additional bearing 144 affixed to housing 32 whereby transverse shaft 40 may then be affixed to the portion of output shaft 140 extending from housing 32.

As further understood from FIGS. 5-10B, landing gear 30 includes a lift nut 146 that is fixedly mounted to leg 34 with elevation screw 52 rotating within lift nut 146 to extend and retract leg 34. Also included is a floor base 148 that is fixedly mounted within housing 32, with a thrust washer 150 being positioned between floor base 148 and output drive bevel gear 50 when assembled. Output bevel gear 50 includes a cavity or slot 152 within which a drive pin 154 is located, where drive pin 154 is passed through a hole 156 in shaft 158 of elevation screw 52 with drive pin 154 operating to transmit rotational torque from output bevel gear 50 to elevation screw 52. As discussed below, cavity 152 is sufficiently deep relative to the bottom surface 160 to enable shaft 158 to move transversely relative to output bevel gear 50 between a first position illustrated in FIG. 10A associated with high speed operation and a second position illustrated in FIG. 10B associated with low speed operation.

As previously noted, when gear assembly 42 is assembled primary and secondary planetary gear assemblies are positioned within the interior 60 of ring gear 46. In addition, a retaining ring 162 is positioned between the primary planet gears 66 and secondary planet gears 84. Ring gear 46 includes an internal groove formed in teeth 47 with retaining ring 162 being positioned within groove 164. In the illustrated embodiment retaining ring 46 comprises a conventional internal spiral retaining ring.

Figure 10A:
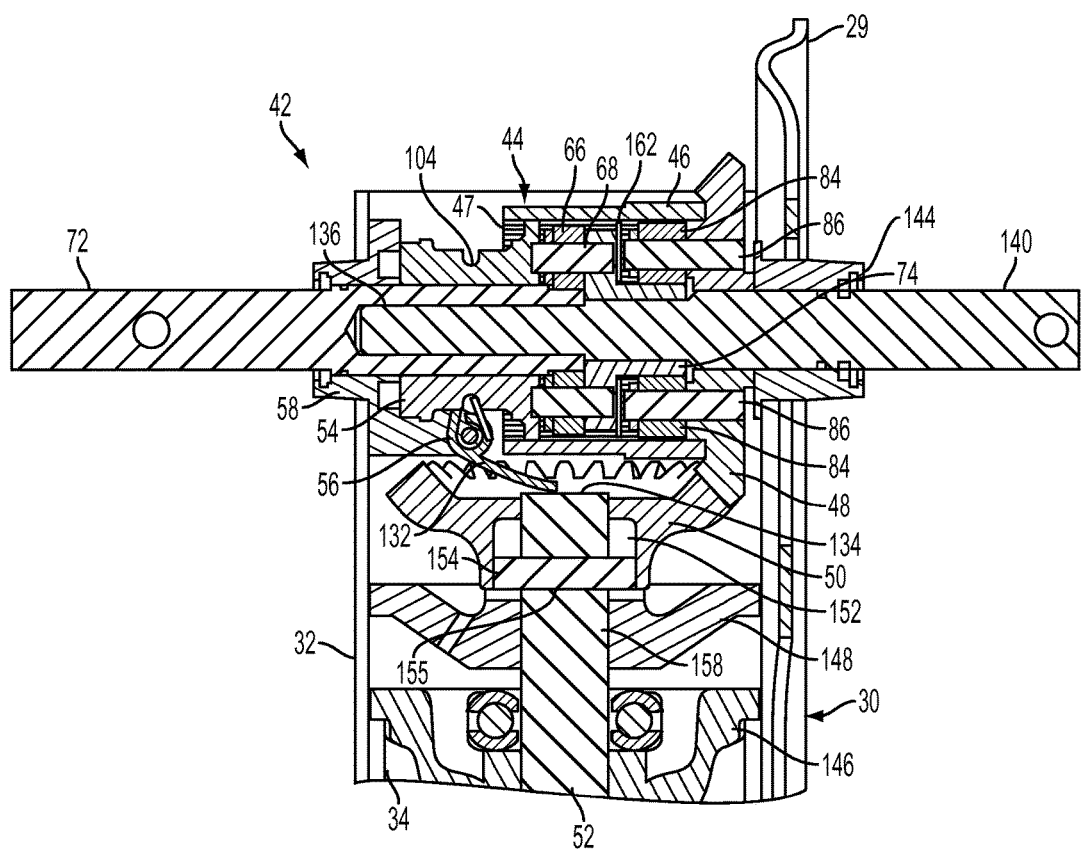
FIG. 10A is a side cross sectional view of the landing gear of FIG. 5 operating in a high gear setting.

The operation of landing gear 30, including the automatic shifting, will now be discussed with principal reference to FIGS. 10A and 10B. In the high gear orientation of FIG. 10A, shift member 54 is in a first position biased out of engagement with mating gear 106 of actuator mount 58 by spring 120 and teeth 103 of geared end 102 of shift member 54 are engaged with internal teeth 47 of ring gear 46. Shift member 54 is additionally biased into engagement with axles 68 of primary planetary gears 66, with the axles 68 being received within elongated apertures 108. Of note the elongated construction of apertures 108 aids in receiving axles 68 therein when shift member 54 is moved into engagement with axles 68. Primary sun gear 70 on input shaft 72 is engaged with primary planet gears 66 such that, with axles 68 engaged with shift member 54, as well as because axles 68 are mounted to gear member 74, rotation of input shaft 72 causes direct drive rotation of the planetary gear assembly to input bevel gear 48. That is ring gear 46 rotates as does gear member 74 without relative rotation of planetary gears 66, 84 such that input bevel gear 48 rotates on a one-to-one rotational basis with input shaft 72 by way of the mounting of secondary planet gears 84 to secondary carrier 92 of input shaft 72 to thereby raise and lower leg 34 when not under load. In the illustrated embodiment input bevel gear 48 and output bevel gear 50 are approximately the same size such that the ratio of rotation of input shaft 72 to elevation screw 52 is one-to-one or approximately one-to-one. Alternatively, however, output bevel gear 50 and input bevel gear 48 may be alternatively sized relative to each other to obtain alternative high gear ratios. For example, output bevel gear 50 may be sized to be smaller than input bevel gear 48 whereby the ratio of input shaft 72 revolutions in high speed to output bevel gear 50 revolutions is less than one, including, for example, in the range of four to one.

Figure 10B:
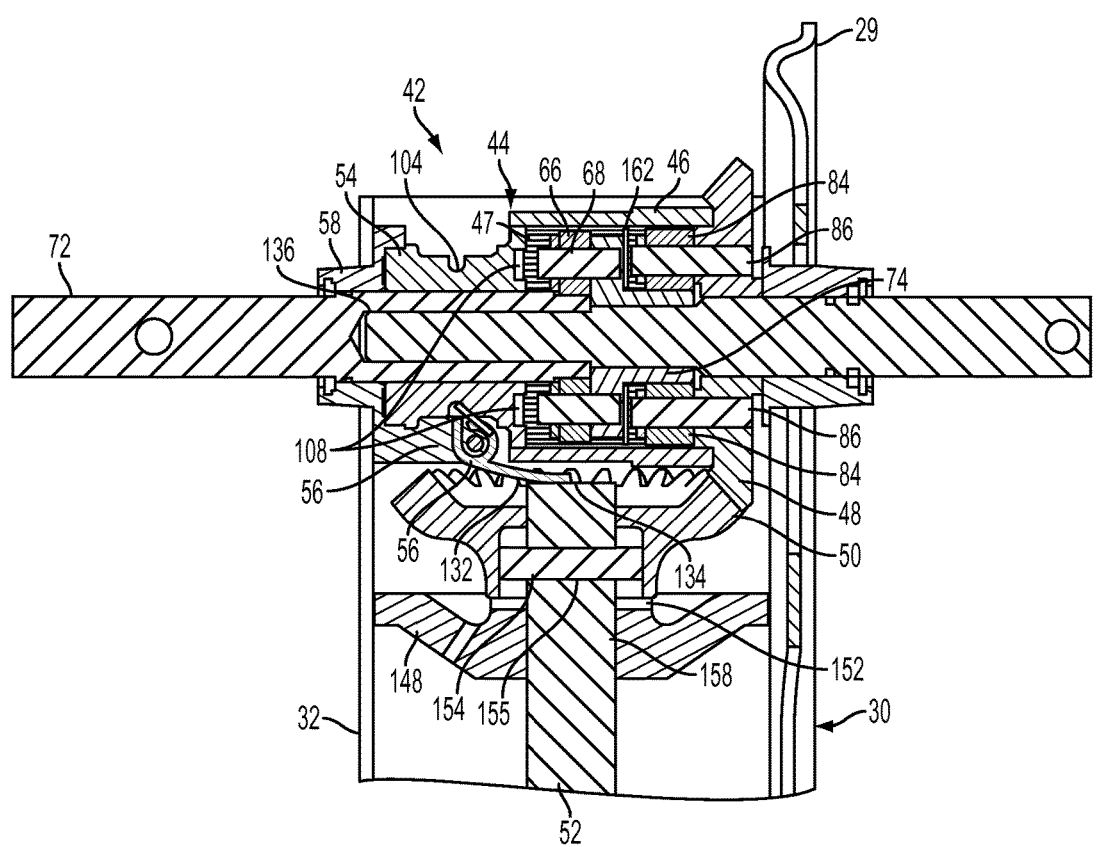
FIG. 10B is a side cross sectional view of the landing gear of FIG. 5 operating in a low gear setting.

As understood from FIG. 10B, upon pad 36 of leg 34 contacting a support surface, elevation screw 52 axially translates upward relative to output bevel 50, with upper portion 134 of shaft 158 acting on tab 132 to pivot actuator 56 upwards against the force of spring 120. The upward axial movement is caused by continued rotation of elevation screw 52 when pad 36 contacts the support surface and is enabled by way of the cavity 152 in output bevel gear 50. Shift member 54 is thereby moved into a second position by actuator 56, with arms 128 axially shifting or moving shift member 54 by way of projections 130 disposed within groove 104 to simultaneously disengage shift member 54 from axles 68 such that axles 68 are no longer contained within apertures 108, as well as to engage teeth 101 of geared end 100 of shift member 54 into engagement with mating gear 106 of actuator mount 58. Teeth 103 of geared end 100, however, remain engaged with teeth 47 of ring gear 46. As understood from FIG. 5B, the axial shifting or movement of shift member 54 when switching between high gear and low gear is transverse to the telescopic movement of leg 34. The engagement of shift member 54 with mating gear 106 prevents shift member 54 from rotating, which in turn also locks and prevents ring gear 46 from rotating. Thus, rotation of input shaft 72 causes rotation of the planetary gear assembly 44 within ring gear 46. That is, primary planet gears 66 are caused to rotate within the interior 60 of ring gear 46, which in turn causes gear member 74 to rotate due to the engagement of axles 68 with primary carrier 76, with secondary sun gear 78 in turn imparting rotation to secondary planet gears 84 within ring gear 46 and thereby rotating input bevel gear 48 by way of their connection via secondary carrier 92 on input bevel gear 48. Accordingly, in low gear or low speed, as shown in FIG. 10B, a reduction occurs between rotation of input shaft 72 and input bevel gear 48. In the illustrated embodiment, secondary sun gear 78 is larger than the primary sun gear 70, and the primary planet gears 66 are larger than the secondary planet gears 84. It should be appreciated, however, that these size differences could be reversed, or the gears of the primary and secondary planetary gear assemblies could be the same. The provision of both primary and secondary planetary gear assemblies 62, 64 enables desired gear ratios to be provided in the low gear setting. A planetary gear assembly in accordance with the present invention may be constructed to have, for example, a ratio of between 20 to 1 to 40 to 1.

Figure 11C:
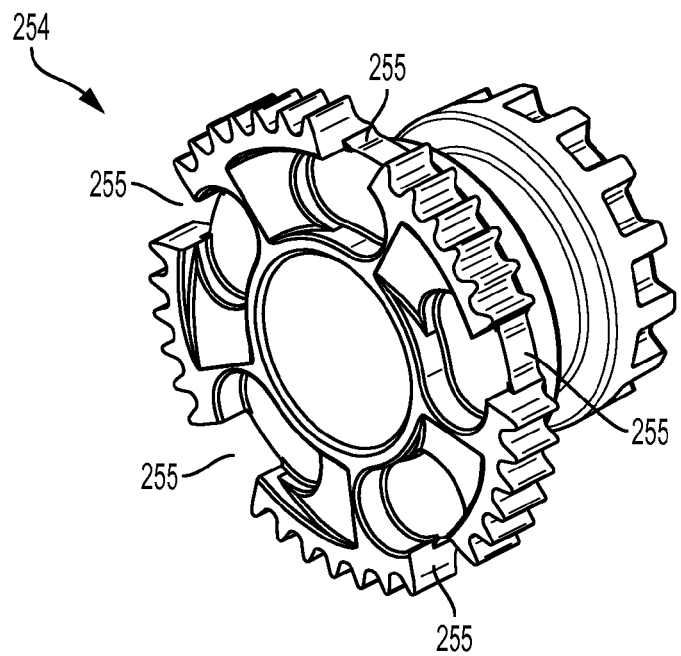
FIGS. 11C and 11D are opposite end perspective views of an alternative shift member for the gear assembly of FIG. 5.
Figure 11D:
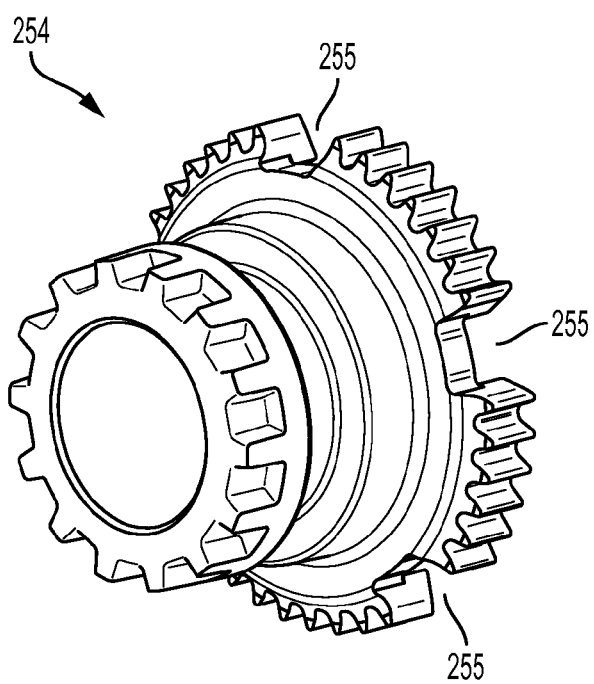

Actuator member 56, shift member 54 and actuator mount 58 thus operate as an actuator assembly to achieve automatic shifting between high and low gear. As disclosed, automatic shifting occurs without any additional action from an operator of landing gear 30 with the input shaft 72 not requiring to be moved, such as in an axial direction or otherwise, to accomplish shifting. Although disclosed as utilizing a mechanical actuation for automatic shifting, automatic shifting of the gear assembly 42 may alternatively be accomplished by way of a solenoid or linear motor, such as to axially move shift member 54. Still further, automatic shifting between high and low speeds may alternatively be accomplished by way of either an increase or decrease in the input or output torque involved in extending and retracting leg 34. For example, input shaft 72 may be connected with gear assembly 42 in similar manner to the construction of a torque wrench whereby upon reaching a particular increase in input torque required to extend leg 34, such as when pad 36 contacts the support surface, automatic shifting to low gear occurs by way of shifting shift member 54. As shown in FIGS. 11C and 11D, an alternative shift member 254 may be employed having ramps 255 formed therein, which in the illustrated embodiment comprise helical ramps. Ramps 255 extend into the elongate openings on shift member 254 (shown at 108 in FIGS. 11A and 11B) and aid in the shifting mechanism operation.

The telescoping legs of the landing gear may be extended when the crank is turned clockwise, with the high gear ratio being minimized to rapidly extend and retract the telescoping leg and thereby minimize the amount of time required for turning of the crank, and the low gear ratio being maximized to decrease the required torque input to facilitate turning of the crank when under loaded conditions. In a particular embodiment, for example, the high and low gear ratios were 2.5 turns and 34 turns, respectively, for a one-inch displacement of the telescoping leg.

A method of automatically shifting a landing gear thus comprises axially displacing an elevation member within a housing member via a drive motor by raising or lowering an associated telescopic leg into contact with a support surface, and preventing rotation of a ring gear of a planetary gear assembly as a result thereof. The method further including moving an actuator by the axially displacing of the elevation member, and in turn moving a shift member to prevent rotation of the ring gear.

It should be appreciated, however, that alternative constructions may be employed within the scope of the present invention. For example, a planetary gear system may be provided with more or fewer primary and/or secondary planet gears. Various flanges, gussets or brackets (not shown) may also be used for connecting landing gear to a semitrailer, as may be required. Still further, rather than a hand crank, rotational input motion may be provided by an electric or hydraulic motor. Additional changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A powered landing gear, said powered landing gear comprising:
   a housing member for a landing gear and a telescoping leg member connected with said housing member;
   an internal gear assembly located within said housing member and configured to extend and retract said leg member from said housing member;
   a shaft extending from external of said housing member into said housing member and operatively connected with said internal gear assembly whereby said shaft includes a portion external of said housing member, where said internal gear assembly includes a ring gear arranged to rotate about an axis that is transverse to the telescopic orientation of said leg member with said internal gear assembly having a high speed gear assembly arrangement configured to operate in a high speed setting and having a low speed gear assembly arrangement configured to operate in a low speed setting, with said internal gear assembly configured to automatically shift from the high speed gear assembly arrangement to the low speed gear assembly arrangement; and
   a drive system attached with said housing member, said drive system engaging with said portion of said shaft external of said housing member and including a drive motor and a drive gear with said drive gear disposed externally of said housing member, said drive motor configured to drive said drive gear with said drive gear operatively driving said shaft.

2. The powered landing gear of clam 1, further including a driven gear attached to said shaft, wherein said drive gear operatively drives said driven gear, and further including a connecting gear with said connecting gear being disposed between said drive gear and said driven gear.

3. The powered landing gear of claim 2, wherein said connecting gear is configured to be selectively engaged and disengaged with said drive gear and said driven gear.

4. The powered landing gear of claim 3, further including a handle connected with said connecting gear, said handle configured to be selectively pulled by an operator to disengage said connecting gear from said drive gear and said driven gear.

5. The powered landing gear of claim 3, further including a biasing member engaged with said connecting gear, said biasing member configured to bias said connecting gear into engagement with said drive gear and said driven gear.

6. The powered landing gear of claim 3, wherein said shaft is configured to receive a hand operated crank, and wherein said shaft is rotatable by said crank when said connecting gear is disengaged from said drive gear and said driven gear.

7. The powered landing gear of claim 1, wherein said drive system is selectively disengageable such that said drive motor is prevented from driving said shaft, and wherein said shaft is configured to receive a hand operated crank, and wherein said shaft is rotatable by said crank when said drive system is disengaged.

8. The powered landing gear of claim 7, wherein said crank is mounted to said shaft by a slip ring connector, said slip ring connector configured to allow said shaft to rotate independently of said crank when said drive system is engaged.

9. The powered landing gear of claim 1, further including a limit switch and an actuator, said actuator configured to trip said limit switch when said leg member is moved by said drive system into an elevated position, with said limit switch configured to stop operation of said drive motor when tripped.

10. The powered landing gear of claim 1, further including a limit switch and a limit switch actuator, said limit switch actuator configured to trip said limit switch when said leg member is moved by said drive system into an extended position, with said limit switch configured to stop operation of said drive motor when tripped.

11. The powered landing gear of claim 10, further including an elevation member interconnected with said housing member and said leg member, and wherein said elevation member is configured to both shift said internal gear assembly into the low speed setting and move said limit switch actuator when said leg member engages a support surface upon being moved by said drive system into an extended position, and wherein said limit switch actuator is configured to trip said limit switch when said limit switch actuator is moved by said elevation member.

12. The powered landing gear of claim 11, wherein said internal gear assembly includes an actuator member for shifting said internal gear assembly into the low speed setting, and wherein said elevation member is configured to move said actuator member when said leg member engages a support surface with said actuator member configured to move said limit switch actuator to trip said limit switch.

13. The powered landing gear of claim 12, wherein said actuator member is configured to prevent said ring gear from rotating to shift said internal gear assembly into the low speed setting.

14. The powered landing gear of claim 12 wherein said limit switch actuator is attached to said actuator member.

15. The powered landing gear of claim 10, further including an electrical circuit, and wherein said limit switch and said drive motor are electrically connected with said circuit whereby said circuit operates said drive motor for a predetermined time period upon said limit switch being tripped.

16. A powered landing gear, said powered landing gear comprising:
   a housing member for a landing gear and a telescoping leg member connected with said housing member;
   an internal gear assembly located within said housing member and configured to extend and retract said leg member from said housing member;
   a shaft extending from external of said housing member into said housing member and operatively connected with said internal gear assembly whereby said shaft includes a portion external of said housing member, where said internal gear assembly includes a ring gear arranged to rotate about an axis that is transverse to the telescopic orientation of said leg member with said internal gear assembly having a high speed gear assembly arrangement configured to operate in a high speed setting and having a low speed gear assembly arrangement configured to operate in a low speed setting, with said internal gear assembly configured to automatically shift from the high speed gear assembly arrangement to the low speed gear assembly arrangement; and
   a drive system attached with said housing member, said drive system including a drive motor and a drive gear with said drive gear disposed externally of said housing member, said drive motor configured to drive said drive gear with said drive gear operatively driving said shaft;
   wherein a driven gear is attached to said portion of said shaft external of said housing member, wherein said drive gear operatively drives said driven gear, and further including a connecting gear with said connecting gear being disposed between said drive gear and said driven gear, wherein said connecting gear is configured to be selectively engaged and disengaged with said drive gear and said driven gear, and further including a handle connected with said connecting gear, said handle configured to be selectively pulled by an operator to disengage said connecting gear from said drive gear and said driven gear, and wherein said shaft is configured to receive a hand operated crank with said shaft being rotatable by said crank when said connecting gear is disengaged from said drive gear and said driven gear.

17. The powered landing gear of claim 16, wherein said drive system is selectively disengageable such that said drive motor is prevented from driving said shaft, and wherein said shaft is rotatable by said crank when said drive system is disengaged, and wherein said crank is mounted to said shaft by a slip ring connector, said slip ring connector configured to allow said shaft to rotate independently of said crank when said drive system is engaged.

18. The powered landing gear of claim 16, further including an up limit switch and an up actuator, said up actuator configured to trip said up limit switch when said leg member is moved by said drive system into an elevated position, with said up limit switch configured to stop operation of said drive motor when tripped, and including a down limit switch and a down limit switch actuator, said down limit switch actuator configured to trip said down limit switch when said leg member is moved by said drive system into an extended position, with said down limit switch configured to stop operation of said drive motor when tripped.

19. The powered landing gear of claim 18, further including an elevation member interconnected with said housing member and said leg member, and wherein said elevation member is configured to both shift said internal gear assembly into the low speed setting and move said down limit switch actuator when said leg member engages a support surface upon being moved by said drive system into an extended position, and wherein said down limit switch actuator is configured to trip said down limit switch when said down limit switch actuator is moved by said elevation member.

20. A powered landing gear, said powered landing gear comprising:

a housing member and a telescoping leg member connected with said housing member;

an internal gear assembly located within said housing member and configured to extend and retract said leg member from said housing member;

a shaft extending from external of said housing member into said housing member and operatively connected with said internal gear assembly, where said internal gear assembly includes a ring gear arranged to rotate about an axis that is transverse to the telescopic orientation of said leg member with said internal gear assembly configured to operate in a high speed setting and a low speed setting, with said internal gear assembly configured to automatically shift from the high speed setting to the low speed setting; and a drive system attached with said housing member, said drive system including a drive motor and a drive gear, said drive motor configured to drive said drive gear with said drive gear operatively driving said shaft, and further including an up limit switch and an up actuator, said up actuator configured to trip said up limit switch when said leg member is moved by said drive system into an elevated position, with said up limit switch configured to control the stopping of operation of said drive motor when tripped, and including a down limit switch and a down limit switch actuator, said down limit switch actuator configured to trip said down limit switch when said leg member is moved by said drive system into an extended position, with said down limit switch configured to control the stopping of operation of said drive motor when tripped, and wherein said internal gear assembly includes an actuator member for shifting said internal gear assembly into the low speed setting, and wherein when said leg member engages a support surface said actuator member shifts said internal gear assembly into the low speed setting and said down limit switch actuator trips said down limit switch.

21. The powered landing gear of claim 20, wherein said actuator member and said down limit switch actuator are integrally connected for simultaneous actuation.

22. The powered landing gear of claim 20, further including an electrical circuit, and wherein said down limit switch and said drive motor are electrically connected with said circuit whereby said circuit operates said drive motor for a predetermined time period upon said down limit switch being tripped.

23. The powered landing gear of claim 20, further including a controller, said controller configured to enable a user to at least one of raise or lower said telescoping leg.

* * * * *